(12) United States Patent
Futamura et al.

(10) Patent No.: US 10,406,603 B2
(45) Date of Patent: Sep. 10, 2019

(54) CENTER-ROTATION TYPE TAILSTOCK

(71) Applicant: Futamura Kiki Kabushiki Kaisha, Nagoya-shi, Aichi (JP)

(72) Inventors: Tadahiro Futamura, Aichi (JP); Satoru Yamamura, Aichi (JP); Masaya Satoh, Aichi (JP)

(73) Assignee: FUTAMURA KIKI KABUSHIKI KAISHA, Aichi (JP)

( * ) Notice: Subject to any disclaimer, the term of this patent is extended or adjusted under 35 U.S.C. 154(b) by 20 days.

(21) Appl. No.: 15/571,961

(22) PCT Filed: Apr. 20, 2017

(86) PCT No.: PCT/JP2017/015883
§ 371 (c)(1),
(2) Date: Nov. 6, 2017

(87) PCT Pub. No.: WO2017/188115
PCT Pub. Date: Nov. 2, 2017

(65) Prior Publication Data
US 2018/0147633 A1  May 31, 2018

(30) Foreign Application Priority Data

Apr. 28, 2016 (JP) ................................ 2016-091207
Nov. 10, 2016 (JP) ................................ 2016-219547

(51) Int. Cl.
*B23B 23/00* (2006.01)
*B23B 23/04* (2006.01)

(52) U.S. Cl.
CPC .............. *B23B 23/00* (2013.01); *B23B 23/04* (2013.01); *B23B 2233/12* (2013.01)

(58) Field of Classification Search
CPC ...... B23B 2233/12; B23B 23/00; B23B 23/04
See application file for complete search history.

(56) References Cited

U.S. PATENT DOCUMENTS 4,033,211 A * 7/1977 Swenson ................. B23B 23/04
142/53
4,828,437 A * 5/1989 Mukherjee .............. B23B 23/00
269/20

(Continued)

FOREIGN PATENT DOCUMENTS

| JP | 61-12607 | 1/1986 |
| JP | 6-80502 | 11/1994 |

OTHER PUBLICATIONS

Official Communication issued in Patent Application No. PCT/JP2017/015883, dated Jul. 4, 2017.

*Primary Examiner* — Sara Addisu
(74) *Attorney, Agent, or Firm* — Greenblum & Bernstein, P.L.C.

(57) ABSTRACT

In a center-rotation type tailstock, unavailable time due to replacement of parts such as bearings is shortened. A built-in hole is formed in a tailstock spindle. A center rotating mechanism unit is attachable to and detachable from the built-in hole. In the unit, a rotary shaft is supported in a tubular body by bearings. The rotary shaft is made enable a center to be attached. When replacing the parts in the unit attached to the built-in hole, the unit is detached from the built-in hole, and another center rotating mechanism unit incorporating new parts is attached to the built-in hole.

20 Claims, 6 Drawing Sheets

(56) References Cited

U.S. PATENT DOCUMENTS

| | | | | |
|---|---|---|---|---|
| 4,870,786 A | * | 10/1989 | Millay | B23B 23/00 |
| | | | | 451/5 |
| 5,373,760 A | * | 12/1994 | Schmidt | B23B 23/04 |
| | | | | 142/53 |
| 2006/0037444 A1 | * | 2/2006 | Robinson | B23B 23/04 |
| | | | | 82/170 |

* cited by examiner

[Fig. 1]
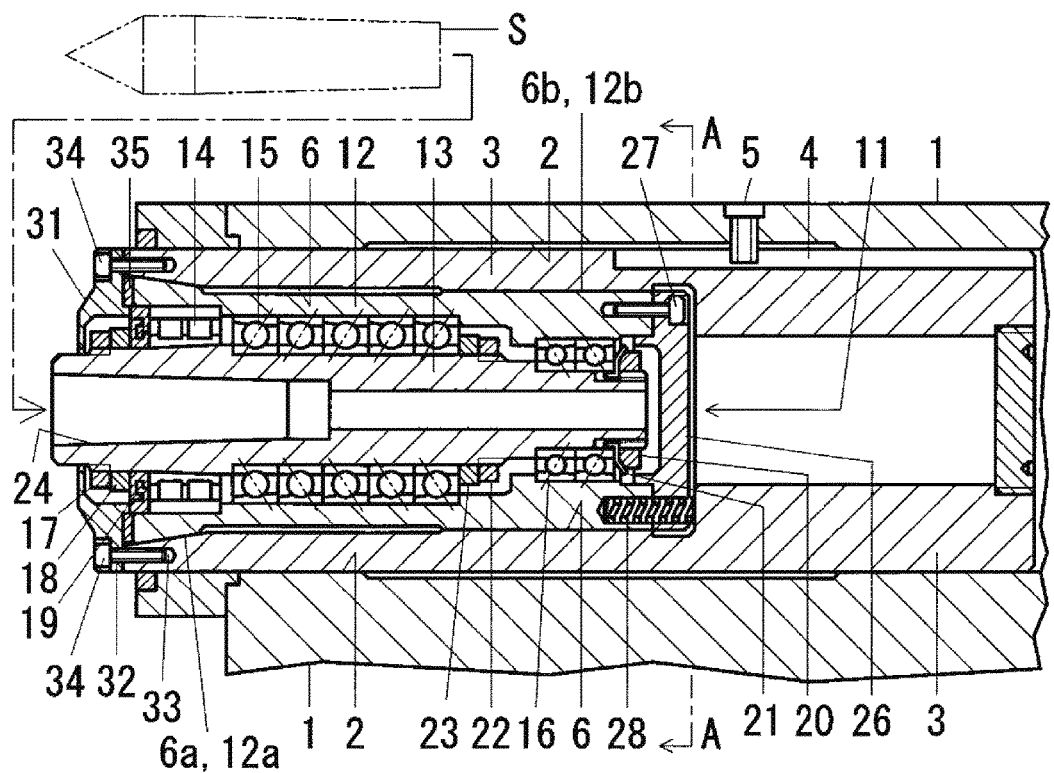
[Fig. 2]
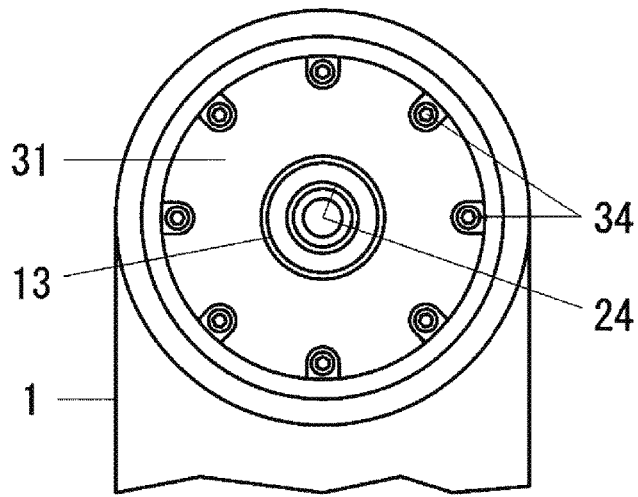

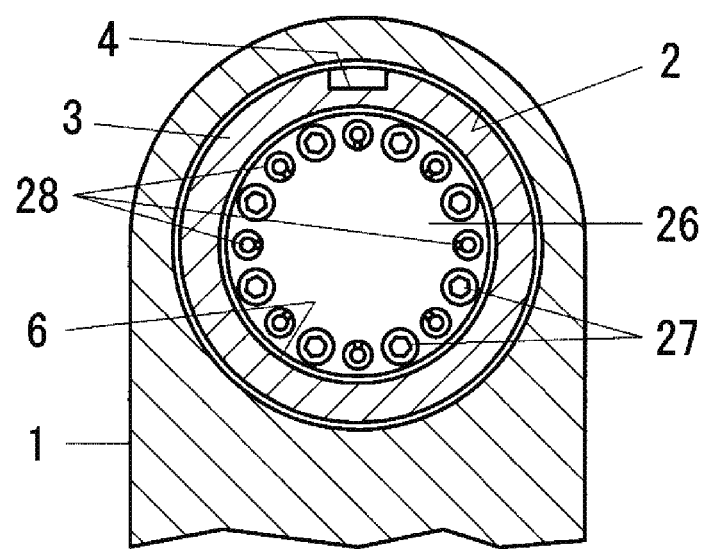
[Fig. 3]

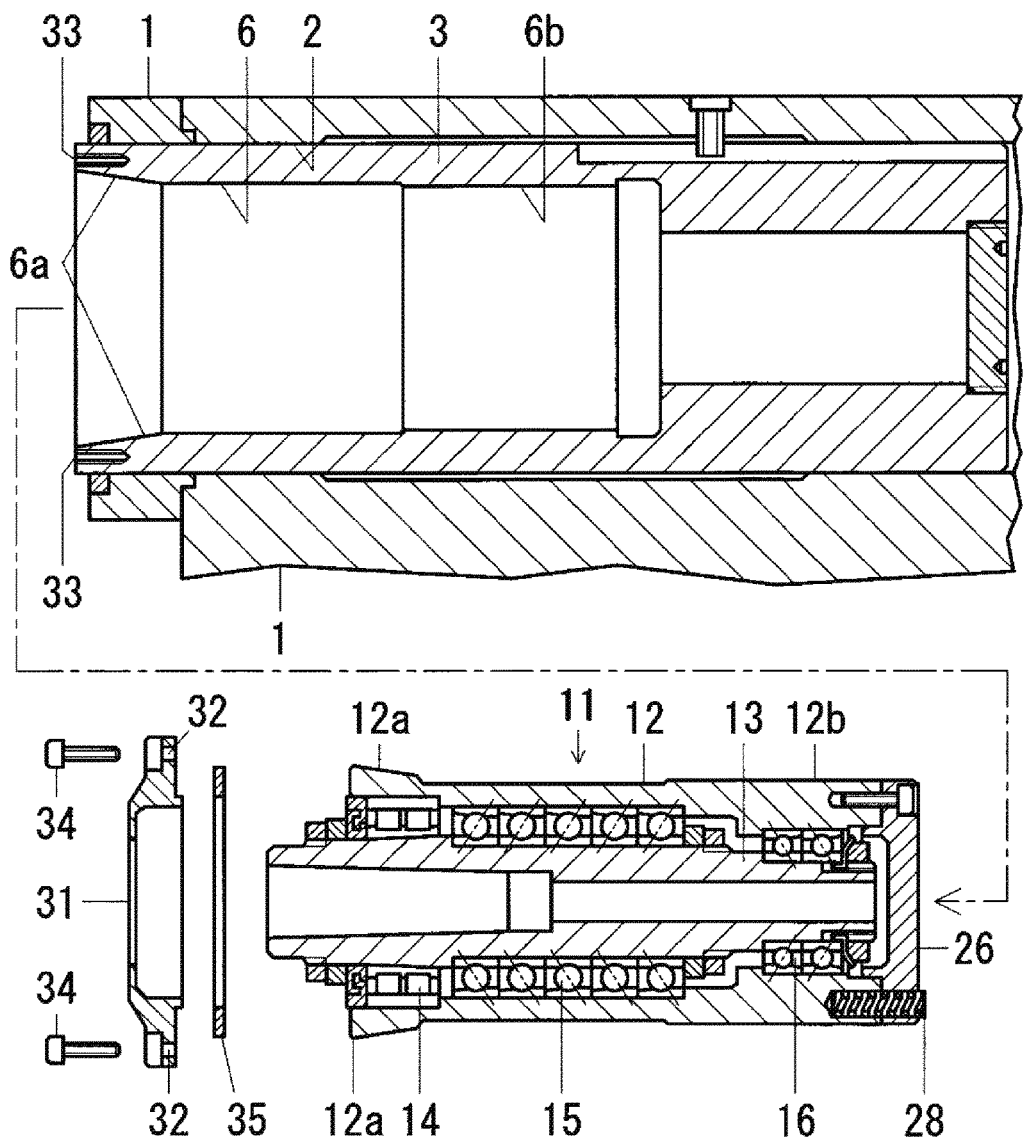
[Fig. 4]

[Fig. 5]
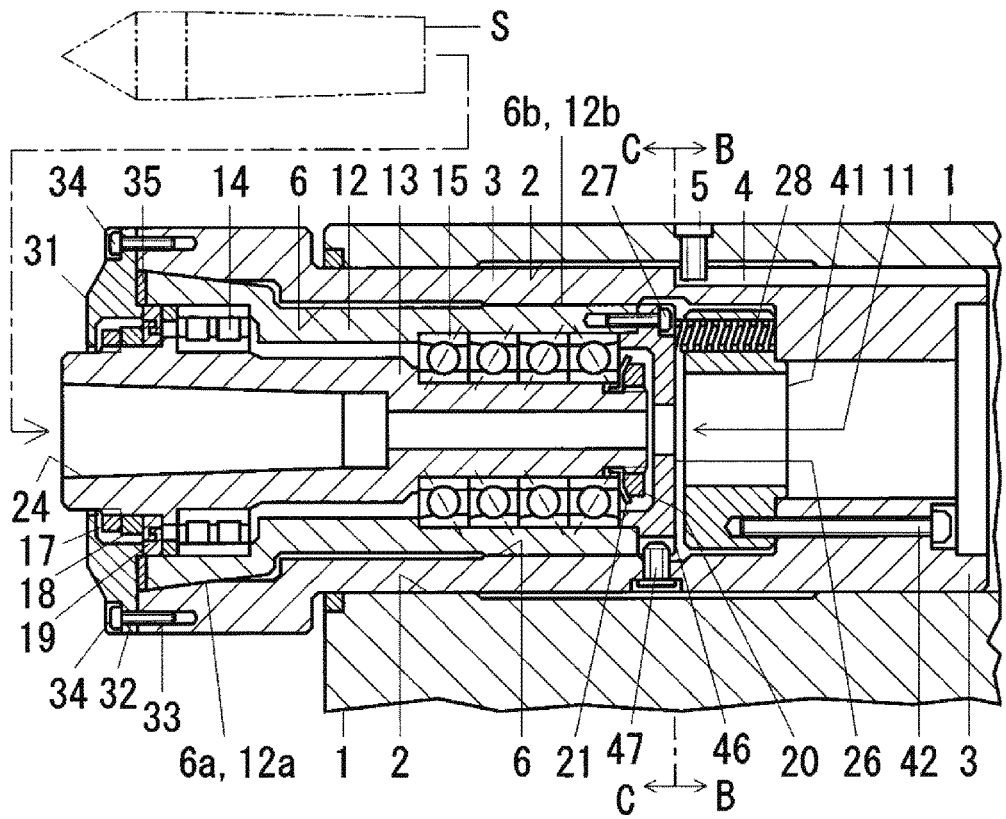
[Fig. 6]
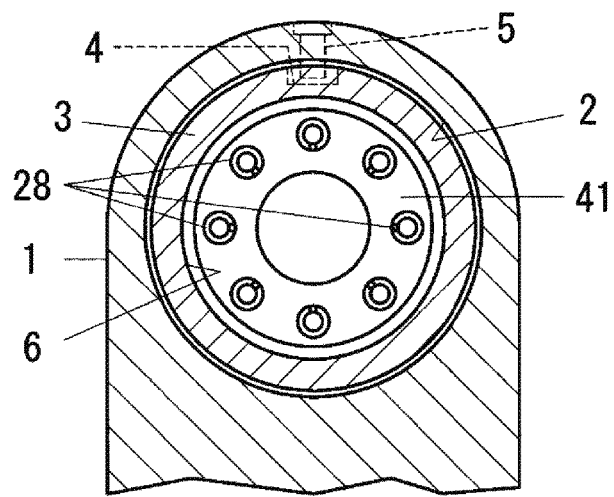

[Fig. 7]
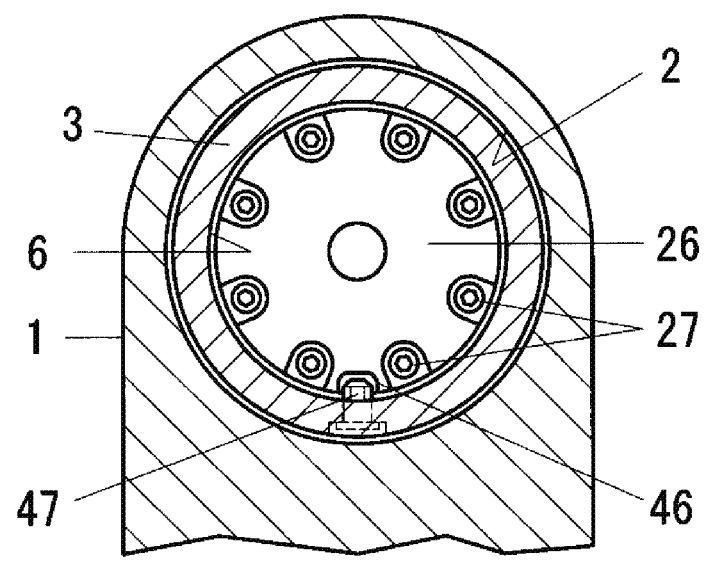

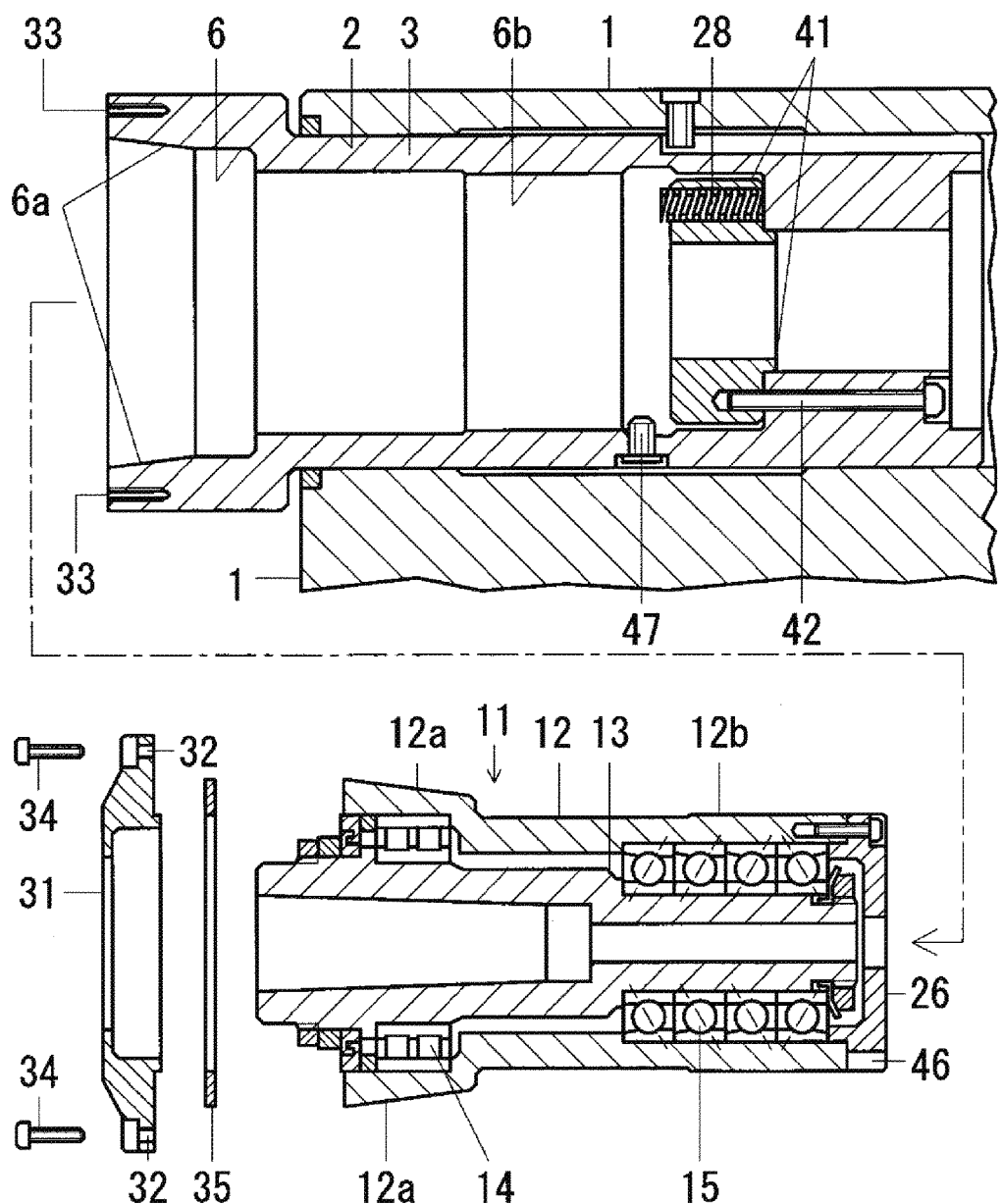
[Fig. 8]

CENTER-ROTATION TYPE TAILSTOCK

TECHNICAL FIELD

The present invention relates to a center-rotation type tailstock in which a rotary shaft for attaching a center is incorporated in a tailstock spindle.

BACKGROUND ART

In a turning machine tool represented by a lathe and a cylindrical grinding machine, a headstock and a tailstock are arranged so as to face each other. The turning machine tool is configured to support a turning object, work between the headstock and the tailstock.

In the tailstock, a shaft hole is passed through a main body along a front-rear direction. A tailstock spindle is fitted in the shaft hole to be movable back and forth. The tailstock spindle is directed its front end to the headstock, and arranged concentrically with a main spindle of the headstock. A center is concentrically attachable to the front end of the tailstock spindle. The tailstock spindle is non-rotatable relative to the main body.

In a center-rotation type tailstock, a center hole is formed in the tailstock spindle. A rotary shaft is supported in the center hole by bearings. The rotary shaft is rotatable and non-movable back and forth relative to the tailstock spindle. A center is concentrically attachable to a front end of the rotary shaft. A dead center attached to the rotary shaft rotates along with the turning object during rotation together with the rotary shaft. The dead center is used as if it were a live center.

PRIOR ART DOCUMENT

Patent Document

Patent Document 1: JP S61 (1986)-012607U

SUMMARY OF INVENTION

Problem to be Solved by Invention

[Problem]

In the center-rotation type tailstock mentioned above, the rotary shaft is supported in an interior of the tailstock spindle in a radial direction and an axial direction by the bearings. The bearings are multiple in order to prevent shake of the rotary shaft. Each of the bearings wears during use. When the wear amount of any one of the bearings exceeds an allowable amount, all the bearings are replaced with new ones.

In replacing the bearings, the tailstock spindle is removed from the main body and the rotary shaft and all the bearings are removed from the tailstock spindle. And then many new bearings and the rotary shaft are incorporated in the tailstock spindle, and the tailstock spindle is attached to the main body. In short, a center rotating mechanism is disassembled and reassembled. The disassembling and reassembling work of the center rotating mechanism having many parts requires many labor and a long time. During the replacement of the bearings, the tailstock is unavailable. The turning machine tool is unable to perform turning works using the tailstock during the long time.

This problem is not limited to the turning machine tool. This is a problem of a machining machine equipped with the center-rotation type tailstock for supporting a machining object. And this is also a problem of a measuring apparatus equipped with the center-rotation type tailstock for supporting a measuring object.

It is desired to shorten the unavailable time of the center-rotation type tailstock when replacing of the bearings.

[Idea and Concept]

In the center-rotation type tailstock, the bearings are fitted between an outer peripheral surface of the rotary shaft and an inner peripheral surface of the tailstock spindle, which is a cylindrical shape with the center hole. The tailstock spindle of a tubular shape also serves as a tubular element for receiving an outer periphery of the bearings of the center rotating mechanism.

Therefore, in the tailstock spindle, an inner peripheral portion, tubular portion that receives the outer periphery of the bearings is separated. In other words, an internal center rotating mechanism in the tailstock spindle is eliminated. That center rotating mechanism is made independent of the tailstock spindle, and remodeled into a separate center rotating mechanism unit. And the center rotating mechanism unit is attached to an interior of the tailstock spindle. In replacing the bearings in the center rotating mechanism unit, the center rotating mechanism unit is detached from the tailstock spindle, and another center rotating mechanism unit incorporating new bearings is attached.

Replacement of many bearings is changed to that of one center rotating mechanism unit. The replacement time becomes short. The unavailable time of the center-rotation type tailstock is shorten.

This way also applies to the case of replacing other parts than the bearings in the center rotating mechanism unit.

[Concretization]

1) A Structure for Replacing the Center Rotating Mechanism Unit

A built-in hole is formed in the tailstock spindle and opened on a front end surface of the tailstock spindle. The center rotating mechanism unit is fitted in the built-in hole and attached, and is drawn out from the built-in hole and detached. That is, the center rotating mechanism unit is made attachable to the built-in hole and detachable from the built-in hole.

In the center rotating mechanism unit, a rotary shaft is supported in a tubular body in a radial direction and an axial direction by bearings. The rotary shaft is rotatable and non-movable back and forth relative to the tubular body. This rotary shaft is made enable a center to be attached.

When replacing the center rotating mechanism unit attached to the built-in hole, the center rotating mechanism unit is detached from the built-in hole, and another center rotating mechanism unit is attached to the built-in hole.

2) A Structure for Concentrically Fitting the Center Rotating Mechanism Unit

A structure for concentrically fitting the center rotating mechanism unit into the built-in hole of the tailstock spindle is constructed.

In the tubular body of the center rotating mechanism unit, an outer diameter of a front end portion is gradually and uniformly expanded from a rear position to a front position, and an outer peripheral surface of the front end portion is made into a conical surface. The front end portion is shaped into a concentric taper with a large diameter front end.

In the built-in hole of the tailstock spindle, an inner diameter of a front end portion is gradually and uniformly expanded from a rear position to a front position, and an inner peripheral surface of the front end portion is made into a conical surface. The front end portion is shaped into a concentric taper with a large diameter front end.

The tapered front end portion of the tubular body and the tapered front end portion of the built-in hole are formed to have the same angle and diameter of the taper.

When the center rotating mechanism unit is inserted into the built-in hole of the tailstock spindle, the tapered front end portion of the tubular body of the center rotating mechanism unit is fitted in the tapered front end portion of the built-in hole, and the conical outer peripheral surface of the front end portion of the tubular body is brought into close contact with the conical inner peripheral surface of the front end portion of the built-in hole. Thus the center rotating mechanism unit is concentrically fitted in the built-in hole.

3) A Structure for Concentrically Fixing the Center Rotating Mechanism Unit

A structure for concentrically fixing the center rotating mechanism unit to the built-in hole of the tailstock spindle is constructed.

The conical outer peripheral surface of the front end portion of the tubular body and the conical inner peripheral surface of the front end portion of the built-in hole are each shaped into a gentle slope relative to its axis.

In inserting the center rotating mechanism unit into the built-in hole, when the tapered front end portion of the tubular body is fitted in the tapered front end portion of the built-in hole, the conical outer peripheral surface of the gentle slope of the front end portion of the tubular body is tightly fitted into the conical inner peripheral surface of the gentle slope of the front end portion of the built-in hole. Thus the center rotating mechanism unit is concentrically fixed to the built-in hole.

4) A Structure for Making the Center Rotating Mechanism Unit Easy to Draw Out

In the center rotating mechanism unit fitted in the built-in hole of the tailstock spindle, during use, the rotary shaft with the center attached receives a rearward force. This force is transmitted to the tubular body via the bearings. The tubular body is pushed in a fitting direction with the rearward force from the rotary shaft, and the conical outer peripheral surface of the front end portion of the tubular body is pressed to the conical inner peripheral surface of the front end portion of the built-in hole. When the fitting direction force received by the rotary shaft is large, the tubular body is strongly pushed in the fitting direction, and the conical outer peripheral surface of the front end portion of the tubular body is excessively tightly fitted into the conical inner peripheral surface of the front end portion of the built-in hole. Thereby, the center rotating mechanism unit becomes hard to draw out from the built-in hole.

Therefore, a structure for making the center rotating mechanism unit easy to draw out from the built-in hole is constructed. In this structure the rearward force, fitting direction force received by the tubular body is reduced by an elastic force of an elastic body.

The elastic body such as a helical spring is attached to a rear end of the tubular body and/or a bottom of the built-in hole. While the center rotating mechanism unit is attached to the built-in hole, the elastic body is compressed between the rear end of the tubular body and the bottom of the built-in hole, and the elastic force of the elastic body acts forward on the tubular body. In this state, when the rearward force acts on the tubular body the rearward force is offset by the forward force due to the elastic body, and the rearward force, fitting direction force acting on the tubular body is reduced. Force of fitting the conical outer peripheral surface of the front end portion of the tubular body into the conical inner peripheral surface of the front end portion of the built-in hole becomes weak. The force of fitting the tubular body is suppressed from becoming excessive. Thus the center rotating mechanism unit becomes easy to draw out from the built-in hole.

5) A Structure for Maintaining a State in which the Center Rotating Mechanism Unit is Concentrically Fitted A structure for maintaining a state in which the center rotating mechanism unit is concentrically fitted in the built-in hole is constructed.

A front lid is removably fixed to the front end surface of the tailstock spindle, which the built-in hole opens. A pressing ring is interposed between a front end surface of the tubular body and a rear surface of the front lid, which faces on the front end surface of the tubular body. The pressing ring is pushed by the front lid and pushes the tubular body rearward, in the fitting direction. The conical outer peripheral surface of the front end portion of the tubular body is pressed against the conical inner peripheral surface of the front end portion of the built-in hole. Thus the state in which the center rotating mechanism unit is concentrically fitted in the built-in hole is maintained.

In addition, in the case in which the pressing ring is shaped thick to have a large dimension in its axial direction, front-rear direction, the force of fitting the center rotating mechanism unit into the built-in hole is increased. On the contrary in the case in which the pressing ring is shaped thin, the force of fitting the center rotating mechanism unit is decreased. The force of fitting the center rotating mechanism unit is adjusted by increasing or decreasing a thickness of the pressing ring.

6) A Structure for Projecting Forward a Front End Portion of the Center Rotating Mechanism Unit and a Front End Portion of the Tailstock Spindle from the Main Body When the conical outer peripheral surface of the front end portion of the tubular body of the center rotating mechanism unit is fitted in the conical inner peripheral surface of the front end portion of the built-in hole, the front end portion of the tailstock spindle is pushed outward from the inside by the front end portion of the tubular body to expand the diameter. In the case in which the force of fitting the center rotating mechanism unit is large, an expansion amount of the front end portion of the tailstock spindle becomes large. When the expansion amount of the outer diameter of the front end portion of the tailstock spindle, which is fitted in the shaft hole of the main body, is large, the tailstock spindle becomes difficult to move back and forth or is fixed to the shaft hole of the main body and becomes unable to move back and forth.

Therefore, the following structure is constructed. The front end portion of the tailstock spindle, which expands by fitting of the center rotating mechanism unit is always projected forward from the main body to prevent from being fitted into the shaft hole of the main body. In other words, even when the tailstock spindle reaches a rearward moving end, the front end portion of the tailstock spindle is projected forward from the main body.

And when the tubular body of the center rotating mechanism unit is fitted in the built-in hole, while the front end portion of the tailstock spindle is expanded, the front end portion of the tubular body is pushed inward from the outside by the tailstock spindle to shrink the diameter. At that time, if the expansion amount of the front end portion of the tailstock spindle and/or the shrinkage amount of the front end portion of the tubular body is not uniform around its axis, the front end portion of the tubular body is displaced from its axial center position Accompanying this, the front end portion of the rotary shaft, which is supported in the tubular body, is displaced from its axial center position, and a tip of the center attached to the front end of the rotary shaft swings in a radial direction. In the case in which the front end portion of the tailstock spindle and/or the front end portion of the tubular body has a thin peripheral wall and is easily deformed, the expansion amount and/or the shrinkage amount is large. When the expansion amount of the front end portion of the tailstock spindle and/or the shrinkage amount of the front end portion of the tubular body is increased, the swing amount of the tip of the center due to non-uniform around the axis of the expansion amount and/or the shrinkage amount is increased.

Therefore, the following structure is constructed. The front end portion of the tailstock spindle and the front end portion of the tubular body are always projected forward from the main body to be able to thicken the peripheral wall without being limited by diameter dimension of the shaft hole of the main body. In other words, even when the tailstock spindle reaches a rearward moving end, the front end portion of the tailstock spindle and the front end portion of the center rotating mechanism unit are projected forward from the main body.

7) A Structure for Positioning a Circumferential Position of the Center Rotating Mechanism Unit Relative to the Tailstock Spindle In attaching of the center rotating mechanism unit to the built-in hole, in the case in which the circumferential position of the center rotating mechanism unit relative to the tailstock spindle is different from that of the previous time, the axial center position of the front end portion of the rotary shaft may be displaced from that of the previous time.

Therefore, a structure for positioning the circumferential position of the center rotating mechanism unit relative to the tailstock spindle is constructed.

A groove is formed on the tubular body of the center rotating mechanism unit along the front-rear direction and opened on a rear end surface and an outer peripheral surface of the tubular body. A pin is penetrated from an outer peripheral surface of the tailstock spindle to the built-in hole, and a tip of the pin is projected into the built-in hole.

In fitting of the center rotating mechanism unit into the built-in hole, when a circumferential position of the groove does not coincide with that of the pin, a rear end of the tubular body abuts against the tip of the pin, and the center rotating mechanism unit fitting stops. The subsequent fitting is unable. When the circumferential position of the groove coincides with that of the pin, the tip of the pin is inserted in the groove, and the center rotating mechanism unit fitting is continued and completed. The circumferential position of the center rotating mechanism unit relative to the tailstock spindle becomes same as that of the previous time. The axial center position displacement of the front end portion of the rotary shaft due to difference in the circumferential position does not occur.

Means for Solving Problem

1. A center-rotation type tailstock in which a tailstock spindle is movable back and forth and non-rotatable, the tailstock being characterized as follows:

A built-in hole is formed in the tailstock spindle and opened on a front end surface of the tailstock spindle. A center rotating mechanism unit is made to be fitted in the built-in hole and attached, and drawn out from the built-in hole and detached.

In the center rotating mechanism unit, a rotary shaft is supported in a tubular body in a radial direction and an axial direction by bearings.

The rotary shaft is rotatable and non-movable back and forth relative to the tubular body and made enable a center to be concentrically attached.

When replacing the center rotating mechanism unit attached to the built-in hole, the center rotating mechanism unit is detached from the built-in hole, and another center rotating mechanism unit is attached to the built-in hole.

2. A center-rotation type tailstock as described in 1, characterized as follows:

A structure for concentrically fitting the center rotating mechanism unit into the built-in hole of the tailstock spindle is constructed.

In the tubular body of the center rotating mechanism unit, an outer peripheral surface of a front end portion is made into a conical surface, and the front end portion is shaped into a concentric taper with a large diameter front end.

In the built-in hole of the tailstock spindle, an inner peripheral surface of a front end portion is made into a conical surface, and the front end portion is shaped into a concentric taper with a large diameter front end.

The tapered front end portion of the tubular body and the tapered front end portion of the built-in hole have the same angle and diameter of the taper.

When the center rotating mechanism unit is inserted into the built-in hole of the tailstock spindle, the tapered front end portion of the tubular body of the center rotating mechanism unit is fitted in the tapered front end portion of the built-in hole, and the conical outer peripheral surface of the front end portion of the tubular body is brought into close contact with the conical inner peripheral surface of the front end portion of the built-in hole.

The center rotating mechanism unit is concentrically fitted in the built-in hole.

3. A center-rotation type tailstock as described in 2, characterized as follows:

A structure for concentrically fixing the center rotating mechanism unit to the built-in hole of the tailstock spindle is constructed.

The conical outer peripheral surface of the front end portion of the tubular body and the conical inner peripheral surface of the front end portion of the built-in hole are each shaped into a gentle slope relative to its axis.

In inserting the center rotating mechanism unit into the built-in hole, when the tapered front end portion of the tubular body is fitted in the tapered front end portion of the built-in hole, the conical outer peripheral surface of the gentle slope of the front end portion of the tubular body is tightly fitted into the conical inner peripheral surface of the gentle slope of the front end portion of the built-in hole, and the center rotating mechanism unit is concentrically fixed to the built-in hole.

4. A center-rotation type tailstock as described in 2 or 3, characterized as follows:

A structure for making the center rotating mechanism unit easy to draw out from the built-in hole is constructed.

In this structure a rearward force, fitting direction force received by the tubular body is reduced by an elastic force of an elastic body.

The elastic body is attached to a rear end of the tubular body and/or a bottom of the built-in hole.

While the center rotating mechanism unit is attached to the built-in hole, the elastic body is compressed between the rear end of the tubular body and the bottom of the built-in hole, and the elastic force of the elastic body acts forward on the tubular body.

When the rearward force acts on the tubular body, the rearward force is offset by the forward force due to the elastic body and reduced. Force of fitting the conical outer peripheral surface of the front end portion of the tubular body into the conical inner peripheral surface of the front end portion of the built-in hole becomes weak.

5. A center-rotation type tailstock as described in 2, 3 or 4, characterized as follows:

A structure for maintaining a state in which the center rotating mechanism unit is concentrically fitted in the built-in hole is constructed.

A front lid is removably fixed to the front end surface, which the built-in hole opens, of the tailstock spindle.

A pressing ring is interposed between a front end surface of the tubular body and a rear surface of the front lid, which faces on the front end surface of the tubular body.

The pressing ring is pushed by the front lid and pushes the tubular body rearward, in a fitting direction. The conical outer peripheral surface of the front end portion of the tubular body is pressed against the conical inner peripheral surface of the front end portion of the built-in hole. The state in which the center rotating mechanism unit is concentrically fitted in the built-in hole is maintained.

6. A center-rotation type tailstock as described in any one of 1 to 5, characterized as follows:

A structure for projecting a front end portion of the tailstock spindle and a front end portion of the center rotating mechanism unit forward from the main body, even when the tailstock spindle reaches a rearward moving end, is constructed.

7. A center-rotation type tailstock as described in any one of 1 to 6, characterized as follows:

A structure for positioning a circumferential position of the center rotating mechanism unit relative to the tailstock spindle is constructed.

A groove is formed on the tubular body of the center rotating mechanism unit along a front-rear direction and opened on a rear end surface and an outer peripheral surface of the tubular body.

A pin is penetrated from an outer peripheral surface of the tailstock spindle to the built-in hole, and a tip of the pin is projected into the built-in hole.

In fitting of the center rotating mechanism unit into the built-in hole, when a circumferential position of the groove does not coincide with that of the pin, a rear end of the tubular body abuts against the tip of the pin, the center rotating mechanism unit fitting is unable. When the circumferential position of the groove coincides with that of the pin, the tip of the pin is inserted in the groove, and the center rotating mechanism unit fitting is completed.

Advantageous Effects

In a center-rotation type tailstock, unavailable time is shortened in replacing parts such as bearings.

BRIEF DESCRIPTION OF DRAWINGS

FIG. 1 A vertical cross-sectional side view of an upper front portion of a center-rotation type tailstock according to a first embodiment of the invention.

FIG. 2 A front view of the center rotation type tailstock.

FIG. 3 A cross-sectional view taken along a line A-A in FIG. 1.

FIG. 4 A vertical cross-sectional side view of the center-rotation type tailstock in a detachment state of a center rotating mechanism unit.

FIG. 5 A vertical cross-sectional side view of an upper front portion of a center-rotation type tailstock according to a second embodiment.

FIG. 6 A cross-sectional view taken along a line B-B in FIG. 5.

FIG. 7 A cross-sectional view taken along a line C-C in FIG. 5.

FIG. 8 A vertical cross-sectional side view of the center-rotation type tailstock in a detachment state of a center rotating mechanism unit.

EMBODIMENT FOR CARRYING OUT INVENTION

[First Embodiment (See FIGS. 1 to 4)]

The present embodiment of a center-rotation type tailstock is illustrated in FIGS. 1 to 3. A shaft hole 2 is passed through an upper portion of a main body 1 along a front-rear direction. A tailstock spindle 3 is fitted in the shaft hole 2 to be movable back and forth. A front end of the tailstock spindle 3 is able to project forward from the main body 1. A rear end of the tailstock spindle 3 is connected to a back-and-forth movement drive mechanism being not illustrated. The tailstock spindle 3 is mounted on the upper portion of the main body 1 so as to be movable back and forth.

A long groove 4 is formed along the front-rear direction on an outer peripheral surface of the tailstock spindle 3. A pin 5 is vertically penetrated an upper peripheral wall portion of the main body 1, and a tip of the pin 5 is projected into the shaft hole 2. The projected tip of the pin 5 is disposed in the long groove 4. A rotation-stop mechanism of the tailstock spindle 3 is constituted by the long groove 4 and the pin 5. The tailstock spindle 3 is non-rotatable relative to the main body 1.

A built-in hole 6 is concentrically formed in the tailstock spindle 3 and opened on a front end surface of the tailstock spindle 3. A center rotating mechanism unit 11 is concentrically fitted in the built-in hole 6 and attached. The unit 11 is attachable. And the center rotating mechanism unit 11 attached to the built-in hole 6 is to be drawn out from the built-in hole 6 and detached. The unit 11 is detachable. In short, the center rotating mechanism unit 11 is attachable to and detachable from the tailstock spindle 3.

In the center rotating mechanism unit 11, a rotary shaft 13 is concentrically inserted in a tubular body 12 and supported in a radial direction and an axial direction by bearings. The bearings are multiple. They are a front radial roller bearing 14, a front angular ball bearing 15 and a rear angular ball bearing 16. The rotary shaft 13 is rotatable and non-movable back and forth relative to the tubular body 12. Incidentally, in FIG. 1, 17 is a front lock nut, 18 is a front spacer ring, and 19 is a labyrinth seal ring. 20 is a rear lock nut, and 21 is a washer. 22 is an intermediate lock nut, and 23 is an intermediate spacer ring.

The rotary shaft 13 is projected forward a front end portion from a front opening of the tubular body 12. A center bore 24 is concentrically formed in the rotary shaft 13 and opened on a front end surface of the rotary shaft 13. The center bore 24 is shaped into a taper so as to enable fitting of a taper shank of a center S. The rotary shaft 13 is made enable the center S to be concentrically attached. It is configured so that the center S attached to the rotary shaft 13 projects forward its tip from the rotary shaft 13.

A structure for concentrically fitting the center rotating mechanism unit 11 into the built-in hole 6 of the tailstock spindle is constructed.

In the tubular body 12, an outer diameter of a front end portion is gradually and uniformly expanded from a rear position to a front position, and an outer peripheral surface of the front end portion is made into a conical surface 12a. The front end portion is shaped into a concentric taper with a large diameter front end.

In the built-in hole 6, an inner diameter of a front end portion is gradually and uniformly expanded from a rear position to a front position, and an inner peripheral surface of the front end portion is made into a conical surface 6a. The front end portion is shaped into a concentric taper with a large diameter front end.

The tapered front end portion of the tubular body 12 and the tapered front end portion of the built-in hole 6 have the same angle and diameter of the taper. They have the same shape dimension.

When the center rotating mechanism unit 11 is inserted into the built-in hole 6, the tapered front end portion of the tubular body 12 is fitted in the tapered front end portion of the built-in hole 6, and the conical outer peripheral surface 12a of the front end portion of the tubular body 12 is brought into close contact with the conical inner peripheral surface 6a of the front end portion of the built-in hole 6. Thus the center rotating mechanism unit 11 is concentrically fitted in the built-in hole 6.

And a structure for concentrically fixing the center rotating mechanism unit 11 to the built-in hole 6 is constructed.

In the tapered front end portion of the tubular body 12 and the tapered front end portion of the built-in hole 6, an inclination angle of a generating line relative to an axis of the taper (=half of taper angle) is made small, 10 degrees or less. In the embodiment, 8 degrees are set. The conical outer peripheral surface 12a of the front end portion of the tubular body 12 and the conical inner peripheral surface 6a of the front end portion of the built-in hole 6 are each shaped into a gentle slope relative to its axis.

In inserting the center rotating mechanism unit 11 into the built-in hole 6, when the tapered front end portion of the tubular body 12 is fitted in the tapered front end portion of the built-in hole 6, the conical outer peripheral surface 12a of the gentle slope of the front end portion of the tubular body 12 is tightly fitted into the conical inner peripheral surface 6a of the gentle slope of the front end portion of the built-in hole 6. Thus the center rotating mechanism unit 11 is concentrically fixed to the built-in hole 6.

In the tubular body 12, a rear end portion is made uniform in an outer diameter, and an outer peripheral surface of the rear end portion is made into a concentric cylindrical surface 12b. In the built-in hole 6, a rear end portion is made uniform in an inner diameter, and an inner peripheral surface of the rear end portion is made into a concentric cylindrical surface 6b. The outer diameter of the rear end portion of the tubular body 12 is smaller than the inner diameter of the rear end portion of the built-in hole 6. The difference between the diameters is made very small. When the center rotating mechanism unit 11 is inserted into the built-in hole 6, the rear end portion of the uniform diameter of the tubular body 12 is fitted in the rear end portion of the uniform diameter of the built-in hole 6.

A structure for making the center rotating mechanism unit 11 easy to draw out from the built-in hole 6 is constructed.

In this structure a rearward force, fitting direction force received by the tubular body 12 is reduced by an elastic force of an elastic body 28.

In the tubular body 12, a rear lid 26 is fixed to a rear end surface by multiple bolts 27, and a helical spring of the elastic body 28 is attached to a rear end along the front-rear direction. The helical spring 28 is passed through the rear lid 26, and its rear end is projected rearward from the rear lid 26. A plurality of the helical springs 28 are arranged in a circumferential direction at equal intervals. Those helical springs 28 are made into the same shape dimension, the same elastic characteristic and arranged in the same position in the front-rear direction.

While the center rotating mechanism unit 11 is attached to the built-in hole 6, the rear end of each of the helical springs 28 is abutted on a bottom of the built-in hole 6, each of the helical springs 28 is compressed, and the elastic force of each of the helical springs 28 acts forward on the tubular body 12.

In this state, when a rearward force acts on the tubular body 12, the rearward force is offset by the forward force due to the helical springs 28, and the rearward force, fitting direction force acting on the tubular body 12 is reduced. Force of fitting the conical outer peripheral surface 12a of the front end portion of the tubular body 12 into the conical inner peripheral surface 6a of the front end portion of the built-in hole 6 becomes weak. The force of fitting the tubular body 12 is suppressed from becoming excessive. Thus the center rotating mechanism unit 11 becomes easy to draw out from the built-in hole 6.

A structure for maintaining a state in which the center rotating mechanism unit 11 is concentrically fitted in the built-in hole 6 is constructed.

A front lid 31 of annular plate shape is put on the front end surface, which the built-in hole 6 opens of the tailstock spindle 3, and the front end portion of the rotary shaft 13 is projected forward from a center hole of the front lid 31. In the front lid 31, bolt holes 32 are penetrated in the front-rear direction at an outer peripheral portion and arranged in a circumferential direction at equal intervals. In the front end surface of the tailstock spindle 3, screw holes 33 are bored in the front-rear direction and arranged in a circumferential direction at equal intervals. A bolt 34 is screwed into the screw hole 33 through the bolt hole 32. The front lid 31 is fixed to the front end surface of the tailstock spindle 3 by a plurality of the bolts 34 at the outer peripheral portion. In short, the front lid 31 is removably fixed to the front end surface, which the built-in hole 6 opens, of the tailstock spindle 3.

A pressing ring 35 of annular plate shape is interposed between a front end surface of the tubular body 12 and a rear surface of the front lid 31, which faces on the front end surface of the tubular body 12.

The pressing ring 35 is pushed by the front lid 31 and pushes the tubular body 12 rearward, in the fitting direction. The conical outer peripheral surface 12a of the front end portion of the tubular body 12 is pressed against the conical inner peripheral surface 6a of the front end portion of the built-in hole 6. Thus the state in which the center rotating mechanism unit 11 is concentrically fitted in the built-in hole 6 is maintained.

In addition, in the case in which the pressing ring 35 is shaped thick and has a large dimension in its axial direction, front-rear direction, the force of fitting the center rotating mechanism unit 11 into the built-in hole 6 is increased. On the contrary in the case in which the pressing ring 35 is shaped thin, the force of fitting the center rotating mechanism unit 11 is decreased. The force of fitting the center rotating mechanism unit 11 is adjustable by increasing or decreasing a thickness of the pressing ring 35.

In the center-rotation type tailstock, when parts such as the bearings 14 to 16 in the center rotating mechanism unit 11 attached to the tailstock spindle 3 are replaced, the center rotating mechanism unit 11 is detached from the tailstock spindle 3. Then another center rotating mechanism unit 11 that new parts such as the bearings 14 to 16 are incorporated is attached to the tailstock spindle 3.

In detaching the center rotating mechanism unit 11, as shown in FIG. 4, each of the bolts 34 is pulled back and extracted, and the front lid 31 is removed. And the pressing ring 35 is removed. That is, the maintenance of the fitting state of the center rotating mechanism unit 11 is released. Next, the center rotating mechanism unit 11 is drawn out from the built-in hole 6.

In attaching the center rotating mechanism unit 11, the center rotating mechanism unit 11 is fitted in the built-in hole 6. Next the pressing ring 35 is put on the front end surface of the tubular body 12, and the front lid 31 is put on the pressing ring 35 and the front end surface of the tailstock spindle 3. Each of the bolts 34 is screwed into the screw hole 33 through the bolt hole 32. The front lid 31 is fixed to the front end surface of the tailstock spindle 3. In short, the fitting state of the center rotating mechanism unit 11 is maintained.

[Second Embodiment (See FIGS. 5 to 8)]

In the present embodiment of a center-rotation type tailstock, the front end portion of the center rotating mechanism unit 11 and the front end portion of the tailstock spindle 3 are always projected forward from the main body 1. That is, the following structure is constructed. As shown in FIG. 5, even when the tailstock spindle 3 reaches a rearward moving end, the front end portion of the tailstock spindle 3 and the front end portion of the center rotating mechanism unit 11 are projected forward from the main body 1. The tailstock spindle 3 is configured in a mechanism in which the front end portion is not fitted into the shaft hole 2 of the main body 1. Even in the case in which the front end portion of the tailstock spindle 3 is expanded by the fitting of the center rotating mechanism unit 11, the back-and-forth movement of the tailstock spindle 3 is not obstructed, and smoothly done.

Furthermore, in the tailstock spindle 3, an outer diameter of the front end portion is larger than a diameter of the shaft hole 2 of the main body 1, and a peripheral wall between an outer peripheral surface and an inner peripheral surface, which is a peripheral surface of the built-in hole 6, is thickened so that its deformation is difficult. An amount to expand by the fitting of the center rotating mechanism unit 11 is decreased. And also in the front end portion of the tubular body 12 of the center rotating mechanism unit, a peripheral wall is thickened so that its deformation is difficult. An amount to shrink by the fitting of the center rotating mechanism unit 11 is decreased.

Since the expansion amount of the front end portion of the tailstock spindle 3 and the shrinkage amount of the front end portion of the tubular body 12 are small, when the expansion amount and/or the shrinkage amount is not uniform around the axis, an axial center position displacement of the front end portion of the rotary shaft 13, which is supported in the tubular body 12 by the bearings 14 and 15, is decreased. A tip swing amount of the center S attached to the front end portion of the rotary shaft 13 is made small.

And in the present embodiment of a center-rotation type tailstock, as shown in FIGS. 5 to 8, the helical spring of the elastic body 28 for applying forward force to the tubular body 12 is attached to the bottle of the built-in hole 6 and projected forward. The helical spring 28 is not attached to the rear end of the tubular body 12. A bottom member 41 is fixed to a rear end of the built-in hole 6 by a bolt 42. The helical spring 28 is attached to the bottom member 41 along the front-rear direction. A front end of the helical spring 28 is projected forward from a front surface of the bottom member 41, which is a bottle surface of the built-in hole 6. A plurality of the helical springs 28 are arranged in a circumferential direction at equal intervals. Those helical springs 28 are made into the same shape dimension, the same elastic characteristic, and arranged in the same front-rear position.

When the center rotating mechanism unit 11 is attached to the built-in hole 6, the rear lid 26 of the tubular body 12 is abutted on the front end of each of the helical springs 28, each of the helical springs 28 is compressed, and the elastic force of each of the helical springs 28 acts forward on the tubular body 12. When the center rotating mechanism unit 11 is detached, as shown in FIG. 8, the helical springs 28 remain at the bottom of the built-in hole 6.

Furthermore, in the present embodiment of a center-rotation type tailstock a structure for positioning a circumferential position of the center rotating mechanism unit 11 relative to the tailstock spindle 3 is constructed. Each time when the center rotating mechanism unit 11 is attached to the built-in hole 6, a circumferential position of the center rotating mechanism unit 11 relative to the tailstock spindle 3 becomes same. An axial center position displacement of the front end portion of the rotary shaft 13 due to difference in the relative position does not occur.

As shown in FIGS. 5, 7 and 8, a groove 46 is formed on the rear end with the rear lid 26 of the tubular body 12 along the front-rear direction and opened on a rear end surface and an outer peripheral surface of the tubular body 12. A pin 47 is penetrated from an outer peripheral surface of the tailstock spindle 3 to the built-in hole 6, and a tip of the pin 47 is projected into the built-in hole 6.

In fitting of the center rotating mechanism unit 11 into the built-in hole 6, when a circumferential position of the groove 46 does not coincide with that of the pin 47, the rear end of the tubular body 12 abuts against the tip of the pin 47, and the center rotating mechanism unit 11 fitting stops. The subsequent fitting is unable. When the circumferential position of the groove 46 coincides with that of the pin 47, the tip of the pin 47 is inserted in the groove 46, and the center rotating mechanism unit 11 fitting is continued and completed.

The other explanations are the same as in the first embodiment. In the drawings, the same reference numerals as in the first embodiment are given to the same parts as in the first embodiment.

[Modified Example]

The present invention is not limited to the embodiments as described above. The following modifications are exemplified.

1. In the above embodiments, the center-rotation type tailstocks are constructed for a turning machine tool represented by a lathe and a cylindrical grinding machine. The center-rotation type tailstocks may be constructed for other machining machines in which a machining object is supported by a center, or a measuring apparatus in which a measuring object is supported by a center.
2. In the above embodiments, the elastic body 28 for applying a forward force to the center rotating mechanism unit 11 is the helical spring. A spring of the other shape may be used. Alternatively, a rubber member may be used.
3. In the above embodiments, the elastic body 28 for applying a forward force to the center rotating mechanism unit 11 is attached to one of the rear end of the tubular body 12 and the bottom of the built-in hole 6. The elastic body 28 may be attached to both.

4. In the above embodiments, the bearings 14 to 16 in the center rotating mechanism unit 11 are rolling bearings. Sliding bearings may be used.

EXPLANATION OF REFERENCE NUMERALS 1 main body
2 shaft hole of main body
3 tailstock spindle
4 long groove of rotation-stop mechanism of tailstock spindle
5 pin of rotation-stop mechanism of tailstock spindle
6 built-in hole of tailstock spindle
6a conical inner peripheral surface, conical surface of front end portion of built-in hole
6b cylindrical surface of rear end portion of built-in hole
11 center rotating mechanism unit
12 tubular body of center rotating mechanism unit
12a conical outer peripheral surface, conical surface of front end portion of tubular body
12b cylindrical surface of rear end portion of tubular body
13 rotary shaft of center rotating mechanism unit
14 front radial roller bearing
15 front angular ball bearing
16 rear angular ball bearing
17 front lock nut
18 front spacer ring
19 labyrinth seal ring
20 rear lock nut
21 washer
22 intermediate lock nut
23 intermediate spacer ring
24 center bore of rotary shaft
S center
26 rear lid
27 bolt
28 helical spring, elastic body
31 front lid
32 bolt holes
33 screw holes
34 bolt
35 pressing ring
41 bottom member of built-in hole
42 bolt
46 groove of positioning mechanism
47 pin of positioning mechanism

The invention claimed is:

1. A center-rotation type tailstock in which a tailstock spindle is movable back and forth and non-rotatable, the tailstock comprising:
a structure for replacing a center rotating mechanism unit attached to the tailstock spindle; wherein
a built-in hole is formed in the tailstock spindle and opened on a front end surface of the tailstock spindle; and the center rotating mechanism unit is made to be fitted in the built-in hole and attached,
the center rotating mechanism unit comprises a tubular body and a rotary shaft, the rotary shaft is supported in the tubular body by bearings to be rotatable and non-movable back and forth relative to the tubular body, and the rotary shaft is made to enable a center to be attached thereto; and
when replacing the center rotating mechanism unit attached to the built-in hole, the center rotating mechanism unit is detached from the built-in hole, and another center rotating mechanism unit is attached to the built-in hole.

2. A center-rotation type tailstock according to claim 1, further comprising:
a structure for concentrically fitting the center rotating mechanism unit into the built-in hole; wherein
in the tubular body, an outer peripheral surface of a front end portion ade into a conical surface, and the front end portion is shaped into a concentric taper with a large diameter front end;
in the built-in hole, an inner peripheral surface of a front end portion is made into a conical surface, and the front end portion is shaped into a concentric taper with a large diameter front end;
the tapered front end portion of the tubular body and the tapered front end portion of the built-in hole have the same angle and diameter of the taper; and
when the center rotating mechanism unit is inserted into the built-in hole, the tapered front end portion of the tubular body is fitted in the tapered front end portion of the built-in hole, the conical outer peripheral surface of the front end portion of the tubular body is brought into close contact with the conical inner peripheral surface of the front end portion of the built-in hole, and the center rotating mechanism unit is concentrically fitted in the built-in hole.

3. A center-rotation type tailstock according to claim 2, further comprising:
a structure for concentrically fixing the center rotating mechanism unit to the built-in hole; wherein
the conical outer peripheral surface of the front end portion of the tubular body and the conical inner peripheral surface of the front end portion of the built-in hole are each shaped into a gentle slope relative to axis thereof; and
in inserting the center rotating mechanism unit into the built-in hole, when the tapered front end portion of the tubular body is fitted in the tapered front end portion of the built-in hole, the conical outer peripheral surface of the gentle slope of the front end portion of the tubular body is tightly fitted into the conical inner peripheral surface of the gentle slope of the front end portion of the built-in hole, and the center rotating mechanism unit is concentrically fixed to the built-in hole.

4. A center-rotation type tailstock according to claim 2, further comprising:
a structure for making the center rotating mechanism unit easy to draw out from the built-in hole; wherein
a rearward force received by the tubular body is reduced by an elastic force of an elastic body;
the elastic body is attached to a rear end of the tubular body and/or a bottom of the built-in hole;
while the center rotating mechanism unit is attached to the built-in hole, the elastic body is compressed between the rear end of the tubular body and the bottom of the built-in hole, and the elastic force of the elastic body acts forward on the tubular body; and
when the rearward force acts on the tubular body, the rearward force is offset by the forward force due to the elastic body and reduced, force of fitting the conical outer peripheral surface of the front end portion of the tubular body into the conical inner peripheral surface of the front end portion of the built-in hole becomes weak, the force of fitting the tubular body is suppressed from becoming excessive, and the center rotating mechanism unit becomes easy to draw out from the built-in hole.

5. A center-rotation type tailstock according to claim 3, further comprising:
a structure for making the center rotating mechanism unit easy to draw out from he built-in hole; wherein
a rearward force received by the tubular body is reduced by an elastic force of an elastic body;
the elastic body is attached to a rear end of the tubular body and/or a bottom of the built-in hole;
while the center rotating mechanism unit is attached to the built-in hole, the elastic body is compressed between the rear end of the tubular body and the bottom of the built-in hole, and the elastic force of the elastic body acts forward on the tubular body; and
when the rearward force acts on the tubular body, the rearward force is offset by the forward force due to the elastic body and reduced, force of fitting the conical outer peripheral surface of the front end portion of the tubular body into the conical inner peripheral surface of the front end portion of the built-in hole becomes weak, the force of fitting the tubular body is suppressed from becoming excessive, and the center rotating mechanism unit becomes easy to draw out from the built-in hole.

6. A center-rotation type tailstock according to claim 2, further comprising:
a structure for maintaining a state in which the center rotating mechanism unit is concentrically fitted in the built-in hole; wherein
a front lid is removably fixed to the front end surface of the tailstock spindle;
a pressing ring is interposed between a rear surface of the front lid and a front end surface of the tubular body; and
the pressing ring is pushed by the front lid and pushes the tubular body rearward, the conical outer peripheral surface of the front end portion of the tubular body is pressed against the conical inner peripheral surface of the front end portion of the built-in hole, and the state in which the center rotating mechanism unit is concentrically fitted in the built-in hole is maintained.

7. A center-rotation type tailstock according to claim 3, further comprising:
a structure for maintaining a state in which the center rotating mechanism unit is concentrically fitted in the built-in hole; wherein
a front lid is removably fixed to the front end surface of the tailstock spindle;
a pressing ring is interposed between a rear surface of the front lid and a front end surface of the tubular body; and
the pressing ring is pushed by the front lid and pushes the tubular body rearward, the conical outer peripheral surface of the front end portion of the tubular body is pressed against the conical inner peripheral surface of the front end portion of the built-in hole, and the state in which the center rotating mechanism unit is concentrically fitted in the built-in hole is maintained.

8. A center-rotation type tailstock according to claim 4, further comprising:
a structure for maintaining a state in which the center rotating mechanism unit is concentrically fitted in the built-in hole; wherein
a front lid is removably fixed to the front end surface of the tailstock spindle;
a pressing ring is interposed between a rear surface of the front lid and a front end surface of the tubular body; and
the pressing ring is pushed by the front lid and pushes the tubular body rearward, the conical outer peripheral surface of the front end portion of the tubular body is pressed against the conical inner peripheral surface of the front end portion of the built-in hole, and the state in which the center rotating mechanism unit is concentrically fitted in the built-in hole is maintained.

9. A center-rotation type tailstock according to claim 5, further comprising:
a structure for maintaining a state in which the center rotating mechanism unit is concentrically fitted in the built-in hole; wherein
a front lid is removably fixed to the front end surface of the tailstock spindle;
a pressing ring is interposed between a rear surface of the front lid and a front end surface of the tubular body; and
the pressing ring is pushed by the front lid and pushes the tubular body rearward, the conical outer peripheral surface of the front end portion of the tubular body is pressed against the conical inner peripheral surface of the front end portion of the built-in hole, and the state in which the center rotating mechanism unit is concentrically fitted in the built-in hole is maintained.

10. A center-rotation type tailstock according to claim 1, further comprising:
a shaft hole passing through a main body along a front-rear direction, in which the tailstock spindle is fitted; and
a front end portion of the tailstock spindle and a front end portion of the center rotating mechanism unit are always projected forward from the main body, even when the tailstock spindle reaches a rearward moving end.

11. A center-rotation type tailstock according to claim 2, further comprising:
a shaft hole passing through a main body along a front-rear direction, in which the tailstock spindle is fitted; and
a front end portion of the tailstock spindle and a front end portion of the center rotating mechanism unit are always projected forward from the main body, even when the tailstock spindle reaches a rearward moving end.

12. A center-rotation type tailstock according to claim 3, further comprising:
a shaft hole passing through a main body along a front-rear direction, in which the tailstock spindle is fitted; and
a front end portion of the tailstock spindle and a front end portion of the center rotating mechanism unit are always projected forward from the main body, even when the tailstock spindle reaches a rearward moving end.

13. A center-rotation type tailstock according to claim 4, further comprising:
a shaft hole passing through a main body along a front-rear direction, in which the tailstock spindle is fitted; and
a front end portion of the tailstock spindle and a front end portion of the center rotating mechanism unit are always projected forward from the main body, even when the tailstock spindle reaches a rearward moving end.

14. A center-rotation type tailstock according to claim 6, further comprising:
a shaft hole passing through a main body along a front-rear direction, in which the tailstock spindle is fitted; and
a front end portion of the tailstock spindle and a front end portion of the center rotating mechanism unit are always projected forward from the main body, even when the tailstock spindle reaches a rearward moving end.

15. A center-rotation type tailstock according to claim 1, further comprising:
a structure for positioning a circumferential position of the center rotating mechanism unit relative to the tailstock spindle: wherein
a groove is formed on the tubular body along a front-rear direction and opened on a rear end surface and an outer peripheral surface of the tubular body;
a pin is penetrated from an outer peripheral surface of the tailstock spindle to the built-in hole, and a tip of the pin is projected into the built-in hole; and
in fitting of the center rotating mechanism unit into the built-in hole, when a circumferential position of the groove does not coincide with that of the pin, a rear end of the tubular body abuts against the tip of the pin, and the center rotating mechanism unit fitting is unable, when the circumferential position of the groove coincides with that of the pin, the tip of the pin is inserted in the groove, and the center rotating mechanism fitting is completed.

16. A center-rotation type tailstock according to claim 2, further comprising:
a structure for positioning a circumferential position of the center rotating mechanism unit relative to the tailstock spindle: wherein
a groove is formed on the tubular body along a front-rear direction and opened on a rear end surface and an outer peripheral surface of the tubular body;
a pin is penetrated from an outer peripheral surface of the tailstock spindle to the built-in hole, and a tip of the pin is projected into the built-in hole; and
in fining of the center rotating mechanism unit into the built-in hole, when a circumferential position of the groove does not coincide with that of the pin, a rear end of the tubular body abuts against the tip of the pin, and the center rotating mechanism unit fitting is unable, when the circumferential position of the groove coincides with that of the pin, the tip of the pin is inserted in the groove, and the center rotating mechanism unit fitting is completed.

17. A center-rotation type tailstock according to claim 3, further comprising:
a structure for positioning a circumferential position of the center rotating mechanism unit relative to the tailstock spindle: wherein
a groove is formed on the tubular body along a front-rear direction and opened on a rear end surface and an outer peripheral surface of the tubular body;
a pin is penetrated from an outer peripheral surface of the tailstock spindle to the built-in hole, and a tip of the pin is projected into the built-in hole; and
in fitting of the center rotating mechanism unit into the built-in hole, when a circumferential position of the groove does not coincide with that of the pin, a rear end of the tubular body abuts against the tip of the pin, and the center rotating mechanism unit fitting is unable, when the circumferential position of the groove coincides with that of the pin, the tip of the pin is inserted in the groove, and the center rotating mechanism unit fitting is completed.

18. A center-rotation type tailstock according to claim 4, further comprising:
a structure for positioning a circumferential position of the center rotating mechanism unit relative to the tailstock spindle: wherein
a groove is formed on the tubular body along a front-rear direction and opened on a rear end surface and an outer peripheral surface of the tubular body;
a pin is penetrated from an outer peripheral surface of the tailstock spindle to the built-in hole, and a tip of the pin is projected into the built-in hole; and
in fitting of the center rotating mechanism unit into the built-in hole, when a circumferential position of the groove does not coincide with that of the pin, a rear end of the tubular body abuts against the tip of the pin, and the center rotating mechanism unit fitting is unable, when the circumferential position of the groove coincides with that of the pin, the tip of the pin is inserted in the groove, and the center rotating mechanism unit fitting is completed.

19. A center-rotation type tailstock according to claim 6, further comprising:
a structure for positioning a circumferential position of the center rotating mechanism unit relative to the tailstock spindle: wherein
a groove is formed on the tubular body along a front-rear direction and opened on a rear end surface and an outer peripheral surface of the tubular body;
a pin is penetrated from an outer peripheral surface of the tailstock spindle to the built-in hole, and a tip of the pin is projected into the built-in hole; and
in fitting of the center rotating mechanism unit into the built-in hole, when a circumferential position of the groove does not coincide with that of the pin, a rear end of the tubular body abuts against the tip of the pin, and the center rotating mechanism unit fitting is unable, when the circumferential position of the groove coincides with that of the pin, the tip of the pin is inserted in the groove, and the center rotating mechanism unit fitting is completed.

20. A center-rotation type tailstock according to claim 10, further comprising:
a structure for positioning a circumferential position of the center rotating mechanism unit relative to the tailstock spindle: wherein
a groove is formed on the tubular body along a front-rear direction and opened on a rear end surface and an outer peripheral surface of the tubular body;
a pin is penetrated from an outer peripheral surface of the tailstock spindle to the built-in hole, and a tip of the pin is projected into the built-in hole; and
in fitting of the center rotating mechanism unit into the built-in hole, when a circumferential position of the groove does not coincide with that of the pin, a rear end of the tubular body abuts against the tip of the pin, and the center rotating mechanism unit fitting is unable, when the circumferential position of the groove coincides with that of the pin, the tip of the pin is inserted in the groove, and the center rotating mechanism unit fitting is completed.

\* \* \* \* \*